United States Patent
Dulkiewicz et al.

(10) Patent No.: US 10,377,126 B2
(45) Date of Patent: Aug. 13, 2019

(54) RETAINING PLATES AND DISPOSABLE BUILD PLATES FOR ADDITIVE MANUFACTURING SYSTEMS

(71) Applicant: General Electric Company, Schenectady, NY (US)

(72) Inventors: Chad Joseph Dulkiewicz, Simpsonville, SC (US); Donnell Eugene Crear, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 350 days.

(21) Appl. No.: 15/213,906

(22) Filed: Jul. 19, 2016

(65) Prior Publication Data

US 2018/0022044 A1 Jan. 25, 2018

(51) Int. Cl.
| | | |
|---|---|---|
| *B29C 64/00* | (2017.01) | |
| *B29C 64/40* | (2017.01) | |
| *B29C 64/245* | (2017.01) | |
| *B29C 64/20* | (2017.01) | |
| *B33Y 30/00* | (2015.01) | |
| *B33Y 50/02* | (2015.01) | |
| *B29C 64/386* | (2017.01) | |
| *B29C 64/153* | (2017.01) | |

(52) U.S. Cl.
CPC ............ *B33Y 50/02* (2014.12); *B29C 64/00* (2017.08); *B29C 64/20* (2017.08); *B29C 64/245* (2017.08); *B29C 64/386* (2017.08); *B29C 64/40* (2017.08); *B33Y 30/00* (2014.12); *B29C 64/153* (2017.08)

(58) Field of Classification Search
None
See application file for complete search history.

(56) References Cited

U.S. PATENT DOCUMENTS

| 4,927,992 A | * | 5/1990 | Whitlow | ............... B22F 3/1055 |
| | | | | 219/121.65 |
| 5,578,155 A | * | 11/1996 | Kawaguchi | ........... B29C 64/141 |
| | | | | 156/267 |
| 5,738,165 A | * | 4/1998 | Imai | ..................... G03F 7/70875 |
| | | | | 118/728 |

(Continued)

FOREIGN PATENT DOCUMENTS

| WO | 2014072496 A1 | 10/2014 |
| WO | 2015116639 A1 | 8/2015 |

*Primary Examiner* — Jacob T Minskey
*Assistant Examiner* — Baileigh Kate Darnell
(74) *Attorney, Agent, or Firm* — Dale Davis; Hoffman Warnick LLC

(57) ABSTRACT

Additive manufacturing systems are disclosed. The systems may include a base, and a retaining plate coupled to the base. The retaining plate may include a seat formed in an exposed surface of the retaining plate, and a plurality of pads extending laterally into the seat. The additive manufacturing systems may also include a build plate positioned within the seat and contacting the plurality of pads of the retaining plate. The build plate may include a build surface in substantial planar alignment with the exposed surface of the retaining plate. Additionally, the additive manufacturing systems may include a plurality of build plate retention components positioned in the seat of the retaining plate. Each of the plurality of build plate retention components may be utilized to retain the build plate within the seat of the retaining plate.

18 Claims, 17 Drawing Sheets

(56) References Cited

U.S. PATENT DOCUMENTS

| | | | |
|---|---|---|---|
| 6,042,774 A | | 3/2000 | Wilkening et al. |
| 6,091,056 A | * | 7/2000 | Kannan ............. H01L 21/67103 |
| | | | 118/724 |
| 6,483,596 B1 | * | 11/2002 | Philippi ............. G05B 19/4015 |
| | | | 156/272.8 |
| 8,486,490 B2 | * | 7/2013 | Fuwa .................... B22F 3/1055 |
| | | | 427/327 |
| 8,994,592 B2 | | 3/2015 | Scott et al. |
| 9,597,730 B2 | * | 3/2017 | Mironets .............. B23K 26/342 |
| 2004/0020435 A1 | * | 2/2004 | Tsuchiya ................ C23C 14/042 |
| | | | 118/723 VE |
| 2004/0238522 A1 | * | 12/2004 | Edwards ............... B25B 11/005 |
| | | | 219/444.1 |
| 2010/0047470 A1 | * | 2/2010 | Abe ........................ C04B 35/64 |
| | | | 427/553 |
| 2010/0247703 A1 | * | 9/2010 | Shi ........................ B29C 64/165 |
| | | | 425/375 |
| 2015/0037527 A1 | | 2/2015 | Jacobs et al. |
| 2016/0031010 A1 | | 2/2016 | O'Neill et al. |
| 2016/0144428 A1 | * | 5/2016 | Mironets .............. B23K 26/342 |
| | | | 419/7 |
| 2016/0332387 A1 | * | 11/2016 | Jondal .................... B29C 64/20 |

\* cited by examiner

RETAINING PLATES AND DISPOSABLE BUILD PLATES FOR ADDITIVE MANUFACTURING SYSTEMS

TECHNICAL FIELD

The disclosure relates generally to additive manufacturing systems, and more particularly to a retaining plate and a disposable build plate positioned within the retaining plate, and utilized by an additive manufacturing system to build components.

BACKGROUND

Components or parts for various machines and mechanical systems may be built using additive manufacturing systems. Additive manufacturing systems may build such components by continuously layering powder material in predetermined areas and performing a material transformation process, such as sintering, on the powder material. The material transformation process may alter the physical state of the powder material from a granular composition to a solid material to build the component. The components built using the additive manufacturing systems have nearly identical physical attributes as conventional components typically made by performing machining processes on stock material.

Conventional additive manufacturing systems build these components on large, solid build plates. These conventional build plates are often made of two inches of solid metal, for example stainless steel. Aside from being heavy, cumbersome and expensive to initially manufacture, additional costs are typically associated with the use of conventional build plates by the additive manufacturing systems. For example, after a component is built on and removed from the conventional build plate, the build plate must undergo additional processing. Specifically, the build plate must be machined (e.g., resurfaced, planed, milled and the like) before being utilized again by the additive manufacturing system to build another component. The required machining after every component build is expensive and typically requires the build plate to be sent away, which can affect the production time of components when only one or a few build plates are accessible to be used by the additive manufacturing system. Additionally, every time the build plate is machined, the operational life of the build plate is decreased, and the build plate will eventually need to be replaced.

SUMMARY

A first aspect of the disclosure provides an additive manufacturing system. The additive manufacturing system may include a base, and a retaining plate coupled to the base. The retaining plate may include a seat formed in an exposed surface of the retaining plate, and a plurality of pads extending laterally into the seat. The additive manufacturing system may also include a build plate positioned within the seat and contacting the plurality of pads of the retaining plate. The build plate may include a build surface in substantial planar alignment with the exposed surface of the retaining plate. Additionally, the additive manufacturing system may include a plurality of build plate retention components positioned in the seat of the retaining plate. Each of the plurality of build plate retention components may be utilized to retain the build plate within the seat of the retaining plate.

A second aspect of the disclosure provides an additive manufacturing system. The additive manufacturing system may include a base, and a retaining plate coupled to the base. The retaining plate may include at least one opening formed in an exposed surface of the retaining plate, and a pad extending laterally into the at least one opening. The additive manufacturing system may also include at least one build plate positioned within the at least one opening and contacting a pad of the retaining plate. The at least one build plate may include a build surface in substantial planar alignment with the exposed surface of the retaining plate. Additionally, the additive manufacturing system may include a build plate retention component positioned at least partially within the at least one opening of the retaining plate. The build plate retention component may releasably couple the at least one build plate to the retaining plate.

A third aspect of the disclosure provides a retaining plate for an additive manufacturing system. The retaining plate may include an exposed surface, and a first seat formed in the exposed surface. The first seat may include a predetermined depth. The retaining plate may also include at least one pad extending laterally into the first seat from a sidewall of the first seat, and a first group of leaf spring apertures formed in the sidewall of the first seat. Each of the first group of leaf spring apertures may receive at least one leaf spring utilized to retain a first build plate within the first seat.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
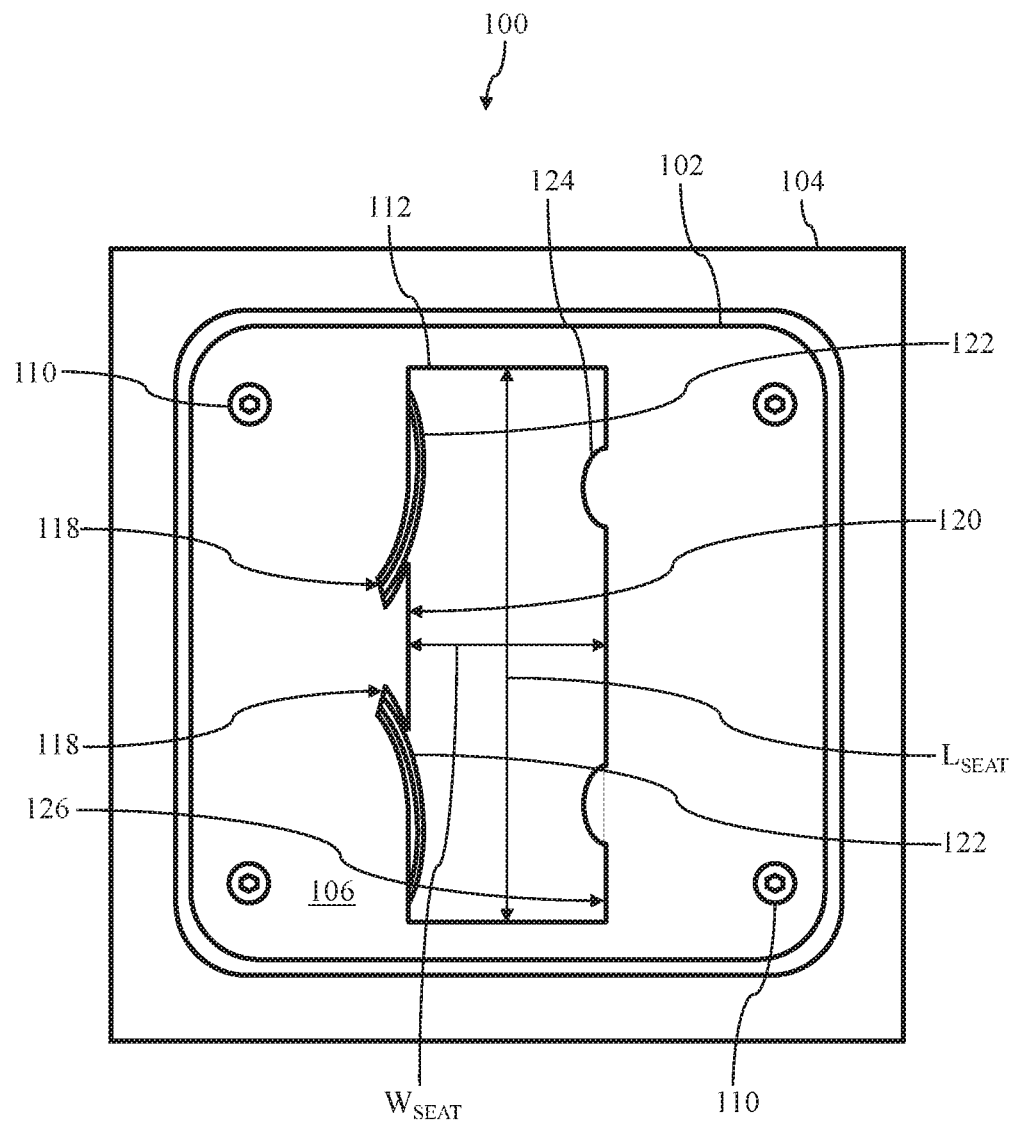
FIG. 1A depicts a top view of an additive manufacturing system including a retaining plate, according to embodiments.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates generally to additive manufacturing systems, and more particularly to a retaining plate and a disposable, build plate positioned within the retaining plate and utilized by an additive manufacturing system to build components.

These and other embodiments are discussed below with reference to FIGS. 1A-14. However, those skilled in the art will readily appreciate that the detailed description given herein with respect to these Figures is for explanatory purposes only and should not be construed as limiting.

Figure 1B:
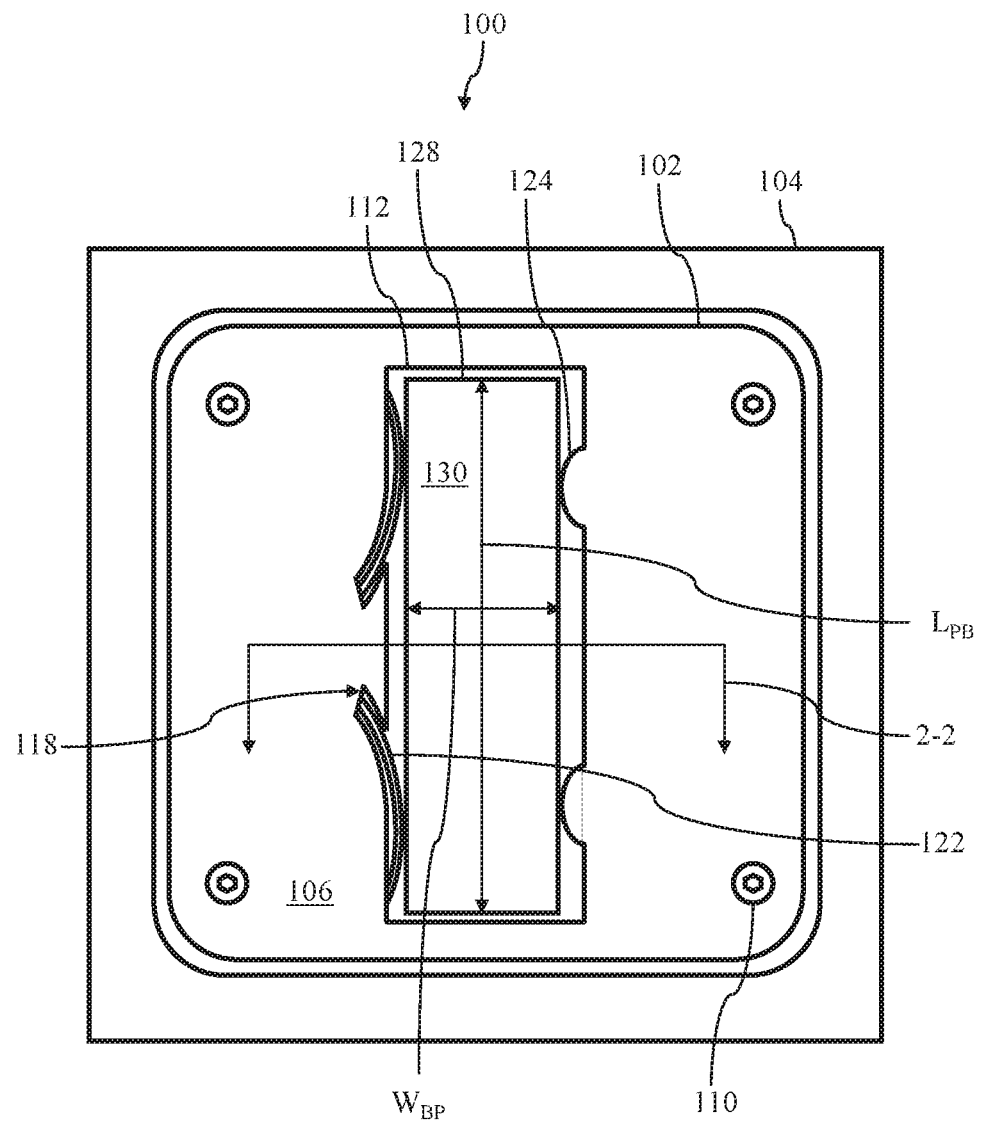
FIG. 1B depicts a top view of the additive manufacturing system of FIG. 1A including a disposable build plate positioned within the retaining plate, according to embodiments.
Figure 2A:
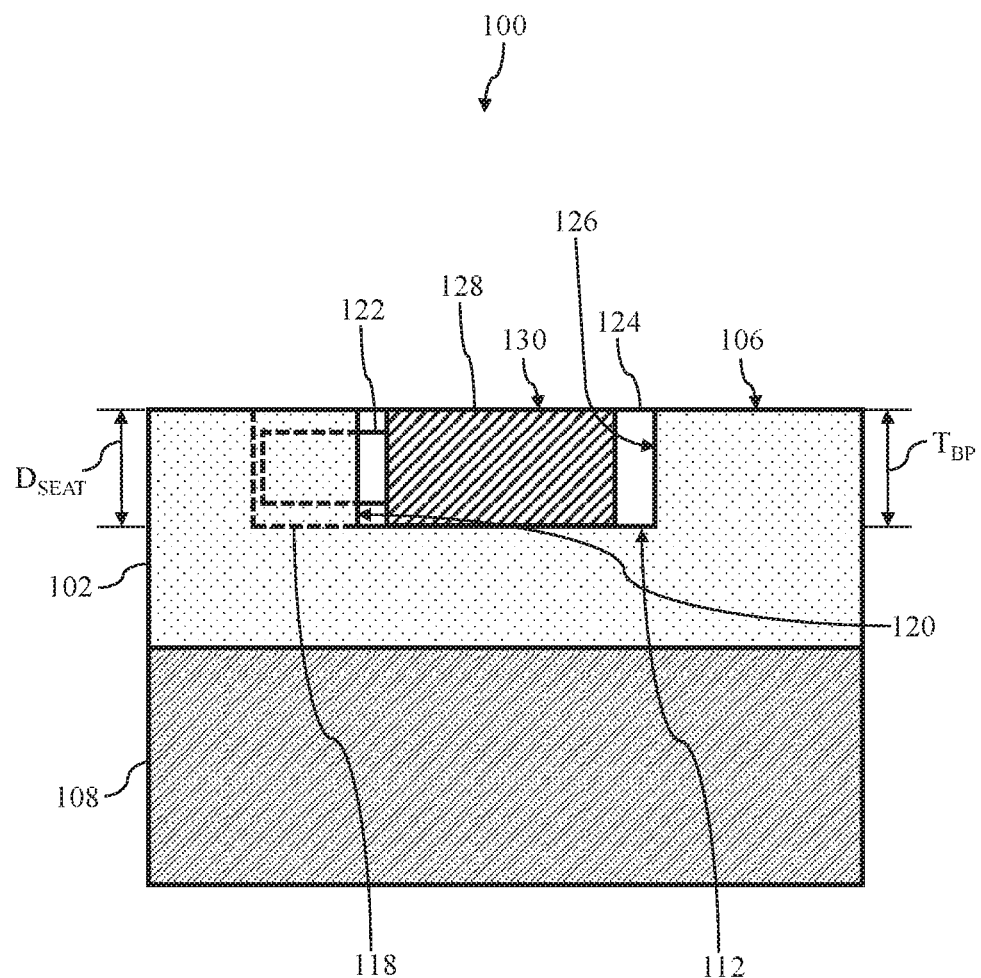
FIG. 2A depicts a side, cross-sectional view of the additive manufacturing system including the retaining plate and the disposable build plate taken along line 2-2 in FIG. 1B, according to embodiments.

FIGS. 1A-2A show illustrative views of a portion of an additive manufacturing system, according to embodiments. Specifically, FIGS. 1A and 1B show top views of an additive manufacturing system including a retaining plate and a disposable build plate (see, FIG. 1B) and FIG. 2A shows a side, cross-sectional view of the additive manufacturing system including the retaining plate and the disposable build plate taken along line 2-2 in FIG. 1B. Additive manufacturing system 100 may include a retaining plate 102 configured to hold, receive and/or house a disposable build plate (see, FIG. 1B) as discussed herein. Retaining plate 102 may be positioned within, positioned on and/or coupled to a support table 104 of additive manufacturing system 100. As shown in FIGS. 1A and 1B, support table 104 may substantially surround retaining plate 102 to support retaining plate 102 and provide extra area and/or surface for additive manufacturing system 100 during the component formation process. Retaining plate 102 may be formed from any substantially rigid material that may be machined and/or processed to form the various features on and/or within retaining plate 102, as discussed in detail below. In non-limiting examples, retaining plate 102 may be formed from metal, metal alloys, polymers, ceramics and any other material having substantially similar physical properties. As discussed herein, while a component is being built by additive manufacturing system 100, retaining plate 102 may move down (e.g., into the page) as the various layers of the component are built. Additionally, support table 104 may remain fixed, or alternatively, may move with retaining plate 102 during the component build process.

Retaining plate 102 may also be coupled to a base 108 (see, FIG. 2A) of additive manufacturing system 100. Briefly turning to FIG. 2A, and with continued reference to FIGS. 1A and 1B, Base 108 may be positioned below retaining plate 102 and support table 104. Retaining plate 102 may be positioned above, positioned on, contact, secured to and/or coupled to base 108 during the component build process performed by additive manufacturing system 100. Retaining plate 102 may be releasably coupled to, affixed and/or secured to base 108 using any suitable coupling component(s) or technique. In a non-limiting example shown in FIGS. 1A and 1B, retaining plate 102 may be coupled to base 108 using mechanical fasteners 110 (e.g., screws, bolts and the like) that may be positioned through retaining plate 102 and at least partially through base 108. In other non-limiting examples, retaining plate 102 may be coupled to base 108 using a magnetic chuck (see, FIGS. 10 and 11), adjustable clamping device (not shown) and the like.

As shown in FIGS. 1A-2A, retaining plate 102 may also include at least one seat 112. Seat 112 may be formed in and/or at least partially through exposed surface 106 of retaining plate 102, and may receive and/or retain a disposable build plate (see, FIG. 1B) as discussed herein. In a non-limiting example, seat 112 may be formed only partially through retaining plate 102, and may be a recess or trench formed in retaining plate 102. In another non-limiting example discussed herein, seat 112 may be formed completely through retaining plate 102, and may be a through-hole or aperture formed in retaining plate 102 (see, FIG. 8). As shown in FIG. 1A, seat 112 may be formed to include a predetermined width ($W_{SEAT}$), and a predetermined length ($L_{SEAT}$). Additionally, and as shown in FIG. 2A, seat 112 of retaining plate 102 may also include a predetermined depth ($D_{SEAT}$). As discussed herein, the predetermined geometric characteristics (e.g., width, length, depth) of seat 112 formed in retaining plate 102 may be dependent, at least in part, on the geometric characteristics of the disposable build plate of additive manufacturing system 100. Seat 112 may be formed in retaining plate 102 using any suitable material removal process including, but not limited to, milling, grinding, cutting, blasting and the like.

Retaining plate 102 may also include a plurality of leaf spring apertures 118. Specifically, and as shown in FIGS. 1A-2A, leaf spring apertures 118, shown in phantom in FIG. 2A, may be formed in a first sidewall 120 of seat 112 of retaining plate 102. Leaf spring apertures 118 may extend at least partially into and/or through retaining plate 102 from first sidewall 120. Leaf spring apertures 118 may receive build plate retention components of additive manufacturing system 100. As discussed herein, the build plate retention components positioned within and/or received by leaf spring apertures 118 may releasably couple and/or retain the disposable build plate within seat 112 of retaining plate 102. In a non-limiting example shown in FIGS. 1A-2A, the build plate retention components may be a plurality of leaf springs 122. As shown in FIG. 1A, each leaf spring aperture 118 may receive at least one of the plurality of leaf springs 122 of additive manufacturing system 100. In a non-limiting example shown in FIG. 2A, leaf spring apertures 118 may be formed to include a depth substantially equal to that of the predetermined depth ($D_{SEAT}$) of seat 112, such that leaf spring apertures 118 are recesses and/or trenches formed in retaining plate 102. In another non-limiting example, not shown, the depth of leaf spring apertures 118 may be less that the predetermined depth ($D_{SEAT}$) of seat 112. Leaf spring apertures 118 of retaining plate 102 may be formed using any suitable material removal process including, but not limited to, milling, grinding, cutting, blasting and the like.

The plurality of leaf springs 122 (e.g., build plate retention components) of additive manufacturing system 100 may be positioned, at least partially, within seat 112 and leaf spring apertures 118. That is, a portion of each of the plurality of leaf springs 122 may be positioned within leaf spring apertures 118, and a remaining portion of each of the plurality of leaf springs 122 may be positioned within seat 112 of retaining plate 102. As shown in FIG. 1A, an end of each of the plurality of leaf springs 122 may also contact first sidewall 120 of seat 112. As discussed herein, the plurality of leaf springs 122 may be utilized to retain and/or releasably couple a disposable build plate of additive manufacturing system 100 within seat 112 of retaining plate 102. As such, leaf springs 122 may be formed from a substantially elastic material and/or a material having substantially elastic properties. In a non-limiting example, leaf springs 122 of additive manufacturing system 100 may be formed from steel. Although two leaf spring apertures 118 and two leaf springs 122 are depicted in FIG. 1A, it is understood that this number of components is merely exemplary, and additive manufacturing system 100 may include more or less leaf spring apertures 118 and/or leaf springs 122. Additionally, although a single leaf spring 122 is depicted in each of the leaf spring apertures 118, it is understood that a plurality of leaf springs 122 may be positioned, at least partially, within a single leaf spring aperture 118 of retaining plate 102.

As shown in FIGS. 1A-2A, retaining plate 102 of additive manufacturing system 100 may also include at least one bump, ridge or pad 124 (hereafter, "pad 124"). Pads 124 may be formed on a second sidewall 126 of seat 112. Each pad 124 may protrude away from second sidewall 126 and may extend laterally into seat 112 of retaining plate 102. As shown in FIG. 1A, pads 124 formed on second sidewall 126 may be positioned opposite and/or may extend toward leaf spring apertures 118 formed on first sidewall 120 of seat 112. Pads 124 may be formed integral with retaining plate 102, as shown in FIG. 1A. Alternatively, pads 124 may be formed from a separate component or part, and may be attached and/or coupled to second sidewall 126 of seat 112. Pads 124 of retaining plate 102 may include any geometry or shape to aid in the releasable coupling retention and/or contacting of a disposable build plate positioned within seat 112 of retaining plate 102 during the component(s) build process, as discussed herein. In a non-limiting example shown in FIG. 1A, pads 124 may include a substantially curved contact surface. Although two pads 124 are shown in FIGS. 1A and 1B, it is understood that this number of pads 124 is merely exemplary, and retaining plate 102 of additive manufacturing system 100 may include more (see, FIG. 5) or less pads 124.

Turning to FIGS. 1B and 2A, with continued reference to FIG. 1A, additive manufacturing system 100 may also include a disposable build plate 128. Disposable build plate 128 (hereafter, "build plate 128") may be positioned, retained and/or releasably coupled within seat 112 of retaining plate 102 and may be utilized by additive manufacturing system 100 to build components. As shown in FIGS. 1B and 2A, build plate 128 may include a build surface 130 that is in substantial planar alignment, substantially level and/or substantially even with exposed surface 106 of retaining plate 102. During the component build process, powdered or granular material may be added to predetermined areas of build surface 130 of build plate 128 and the material added to build plate 128 may subsequently be transformed (e.g., sintered) to build component(s) layer-by-layer using additive manufacturing system 100. As a result of build plate 128 being positioned, retained and/or releasably coupled within seat 112 of retaining plate 102, build plate 128 may move with retaining plate 102 during the component(s) build process. Once the component(s) is built on build surface 130 of build plate 128, the component(s) may be removed and build plate may be disposed of, scraped and/or utilized for another purpose other than building components using additive manufacturing system 100. Alternatively, after the component(s) is built on build surface 130 of build plate 128 and subsequently removed from build plate 128, build plate 128 may be reused by additive manufacturing system 100 and/or undergo another build process, as discussed herein, to have distinct a component(s) built on build surface 130. As discussed herein, the dimensions and/or geometric characteristics allow for build plate 128 to be created quickly, easily and inexpensively. As a result, operators of additive manufacturing system 100 may dispose of build plate 128 after only a single operation of building components, and may insert distinct build plate(s) 128 within retaining plate 102 for performing additional component building processes.

Build plate 128 may be positioned, retained, and/or releasably coupled within seat 112 of retaining plate 102 via leaf springs 122 and/or pads 124. As shown in FIGS. 1B and 2A, leaf springs 122 and pads 124 may contact build plate 128 on opposite sides to retain and/or releasably couple build plate 128 within seat 112 during the component building process. Specifically, leaf springs 122 may contact and/or apply a force against build plate 128 toward pads 124. As a result, build plate 128 is pressed against pads 124 of retaining plate 102 and held and/or maintained within seat 112 via a compressive force. When build plate 128 is positioned within seat 112 of retaining plate 102, build plate 128 may be pressed against and temporarily compress, deform and/or displace leaf springs 122 before positioning an opposite side of build plate 128 adjacent pads 124. Because of leaf springs 122 elastic properties, leaf springs 122 become uncompressed and push build plate 128 toward pads 124, as discussed herein.

Build plate 128 may be made from any suitable material capable of withstanding the processes for building a component using additive manufacturing system 100. In non-limiting examples, build plate 128 may be formed from stainless steel, aluminum or another other material having similar physical, material and/or chemical characteristics. As shown in FIG. 1B, build plate 128 may include a width ($W_{BP}$), and a length ($L_{BP}$) smaller than the predetermined width ($W_{SEAT}$) and predetermined length ($L_{SEAT}$) of seat 112 of retaining plate 102. Specifically, the width ($W_{BP}$) of build plate 128 may be substantially smaller than the distance between pads 124 of retaining plate 102 and first side 120 of seat 112, and the length ($L_{BP}$) of build plate 128 may be substantially smaller than the predetermined length ($L_{SEAT}$) of seat 112. The smaller width ($W_{BP}$) and length ($L_{BP}$) may ensure build plate 128 may be positioned within seat 112 of retaining plate 102. In the non-limiting example shown in FIG. 1B, the difference between the width ($W_{BP}$) and length ($L_{BP}$) of build plate 128, and the predetermined width ($W_{SEAT}$) and predetermined length ($L_{SEAT}$) of seat 112 may be substantially minimal (e.g., less than 0.25") such that leaf springs 122 may be minimally compressed and/or deformed when build plate 128 is inserted into seat 112. In a non-limiting example, the length ($L_{BP}$) of build plate 128 may be within a range of approximately six (6) inches and approximately two (2) feet. Additionally, in a non-limiting example the width ($W_{BP}$) of build plate 128 may be within a range of approximately one (1) inch and approximately six (6) inches.

Additionally, and with reference to FIG. 2A, build plate 128 may include a thickness ($T_{BP}$). The thickness ($T_{BP}$) of build plate 128 may be substantially equal to the predetermined depth ($D_{SEAT}$) of seat 112 formed in retaining plate 102. By having a thickness ($T_{BP}$) substantially equal to the depth ($D_{SEAT}$) of seat 112, build plate 128 may ensure that the build surface 130 of build plate 128 is in planar alignment with exposed surface 106 of retaining plate 102 when build plate 128 is positioned within seat 112. In a non-limiting example the thickness ($T_{BP}$) of build plate 128 may be within a range of approximately a quarter (0.25) inch and approximately two (2) inches.

As discussed herein, the predetermined geometric characteristics (e.g., width, length, depth) of seat 112 formed in retaining plate 102 may be dependent, at least in part, on the geometric characteristics (e.g., width, length, thickness) of build plate 128 of additive manufacturing system 100. That is, in a non-limiting example, build plate may be formed first and may include predetermined geometric characteristics. As a result, seat 112 may be formed in retaining plate 102 subsequent to the formation of build plate 128 and may be formed to include geometric characteristics that are dependent, at least in part, on the predetermined geometric characteristics of build plate 128. In another non-limiting example, seat 112 may first be formed in retaining plate 102 and include the predetermined geometric characteristics. Build plate 128 thus may be formed subsequent to retaining plate 102 and may be formed to include geometric characteristics that are dependent, at least in part, on the predetermined geometric characteristics of seat 112.

Figure 2B:
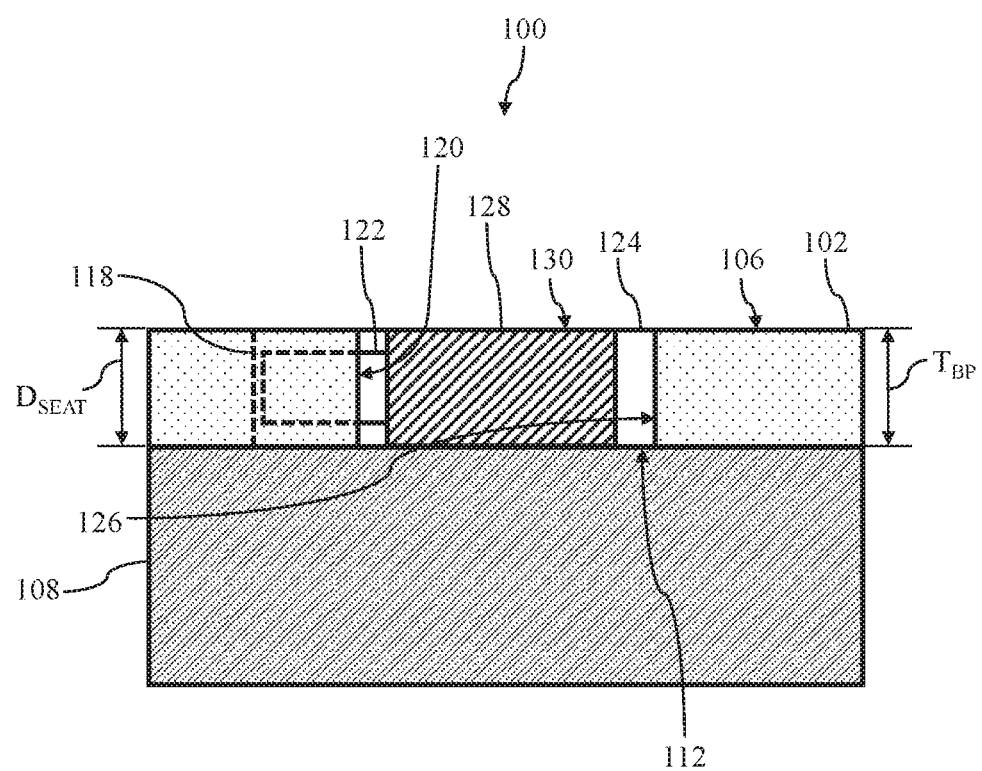
FIG. 2B depicts a side, cross-sectional view of the additive manufacturing system including the retaining plate and the disposable build plate taken along line 2-2 in FIG. 1B, according to additional embodiments.

FIG. 2B depicts a side, cross-sectional view of the additive manufacturing system 100 including retaining plate 102 and disposable build plate 128 taken along line 2-2 in FIG. 1B, according to another embodiment. With comparison to FIG. 2A, retaining plate 102 shown in FIG. 2B may include distinct features. Specifically, retaining plate 102 depicted in FIG. 2B may include seat 112 that formed completely through retaining plate 102 and/or seat 112 is a through-hole or aperture formed completely through retaining plate 102. In the non-limiting example shown in FIG. 2B, and as similarly discussed herein with respect to FIG. 2A, the thickness ($T_{BP}$) of build plate 128 may be substantially equal to the predetermined depth ($D_{SEAT}$) of seat 112 formed in retaining plate 102. By having a thickness ($T_{BP}$) substantially equal to the depth ($D_{SEAT}$) of seat 112, build plate 128 may ensure that the build surface 130 of build plate 128 is in planar alignment with exposed surface 106 of retaining plate 102 when build plate 128 is positioned within seat 112. In response to seat 112 being formed as a through-hole formed through retaining plate 102, build plate 128 may be positioned on, directly contact and/or be supported by base 108 of additive manufacturing system 100.

Figure 3:
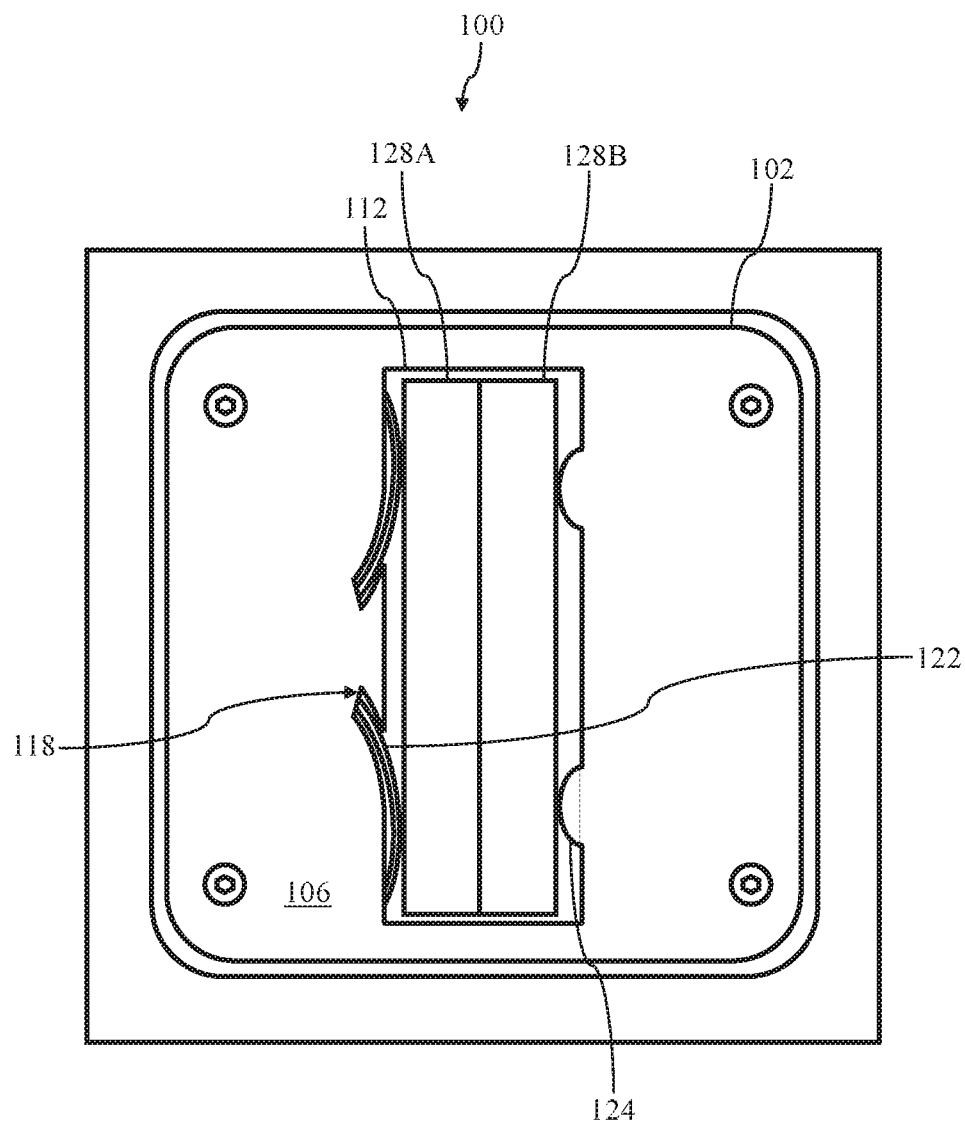
FIG. 3 depicts a top view of an additive manufacturing system including a retaining plate and two distinct disposable build plate, according to embodiments.
Figure 4:
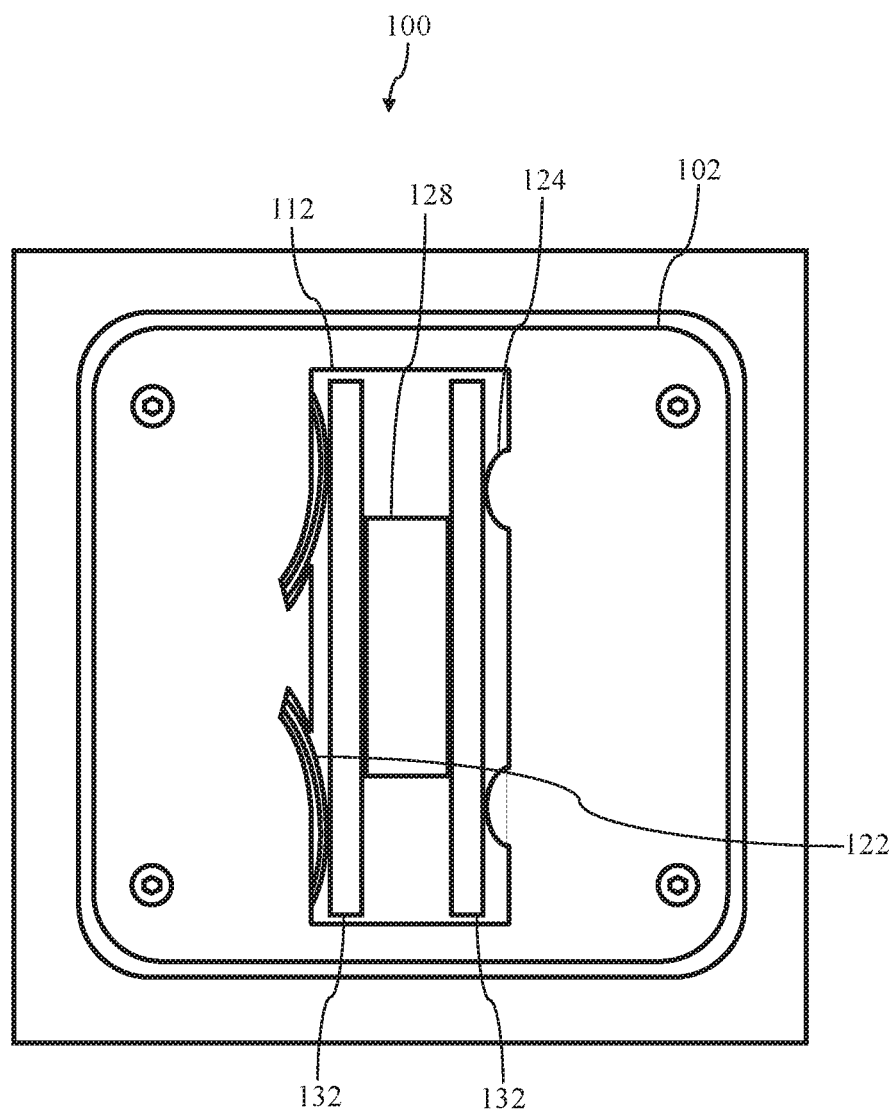
FIG. 4 depicts a top view of an additive manufacturing system including a retaining plate, a disposable build plate and sizing components, according to embodiments.

FIGS. 3 and 4 depict top views of additive manufacturing system 100 utilizing build plates 128 that may include geometric characteristics that are substantially smaller than the predetermined geometric characteristics of seat 112 of retaining plate 102. It is understood that similarly numbered and/or named components may function in a substantially similar fashion. Redundant explanation of these components has been omitted for clarity.

FIG. 3 depicts a top view of additive manufacturing system 100 including two build plates 128A, 128B. As shown in FIG. 3, first build plate 128A and second build plate 128B may include a width that is substantially smaller than the predetermined width ($W_{SEAT}$) of seat 112 of retaining plate 102. However, the combined width of first build plate 128A and second build plate 128B may be substantially similar to the width ($W_{BP}$) of build plate 128 of FIG. 1B, and therefore may only be minimally smaller than the width ($W_{SEAT}$) of seat 112, as discussed above. In the non-limiting example, first build plate 128A and second build plate 128B may both be placed, positioned and/or releasably coupled within seat 112 of retaining plate 102 during the component building process performed by additive manufacturing system 100. That is, and as shown in FIG. 3, first build plate 128A may be positioned within seat 112 adjacent and/or contacting leaf springs 122 positioned within leaf spring apertures 118 of retaining plate 102, and second build plate 128B may be positioned within seat 112 adjacent and/or contacting pads 124. Additionally, first build plate 128A and second build plate 128B may also contact each other within seat 112. As discussed herein, a force is applied to first build plate 128A via leaf springs 122. As such, the force is also applied to second build plate 128B, via first build plate 128A, which in turn pushes and/or presses second build plate 128B into pad 124 and secures first build plate 128A and second build plate 128B within seat 112. In the non-limiting example shown in FIG. 3, components may be built across both first build plate 128A and second build plate 128B, or alternatively, components may be built on first build plate 128A and second build plate 128B individually.

FIG. 4 depicts a top view of additive manufacturing system 100 including disposable build plate 128 and sizing components 132. Compared to FIGS. 1B and 3, build plate 128 depicted in FIG. 4 may be substantially smaller in both width ($W_{BP}$) and length ($L_{BP}$) when compared to the predetermined width ($W_{SEAT}$) and length ($L_{SEAT}$) of seat 112 formed in retaining plate 102. In order for build plate 128 to be utilized, retained and/or releasably coupled within seat 112, additive manufacturing system 100 may utilize sizing components 132. Sizing components 132 may be positioned within seat 112 in order "add" size to build plate 128 so build plate 128 may be retained within seat 112. As shown in FIG. 4, sizing components 132 may be positioned between and may contact build plate 128, leaf springs 122 and pads 124. Specifically, in the non-limiting example, one sizing component 132 may be positioned between and may contact build plate 128 and leaf springs 122, and a distinct sizing component 132 may be positioned between and may contact build plate 128 and pads 124, opposite leaf springs 122. Sizing components 132 may provide build plate 128 with the necessary width ($W_{BP}$) and length ($L_{BP}$) to be retained within seat 112, as discussed herein. The number and/or size of sizing components 132 utilized within seat 112 of retaining plate 102 may be dependent, at least in part, on the geometric characteristics of build plate 128 and/or the geometric characteristics of seat 112. Although two sizing components 132 are shown in FIG. 4, it is understood that this number of sizing components is merely exemplary, and additive manufacturing system 100 may include or utilize more or less sizing components 132 as needed.

Figure 5:
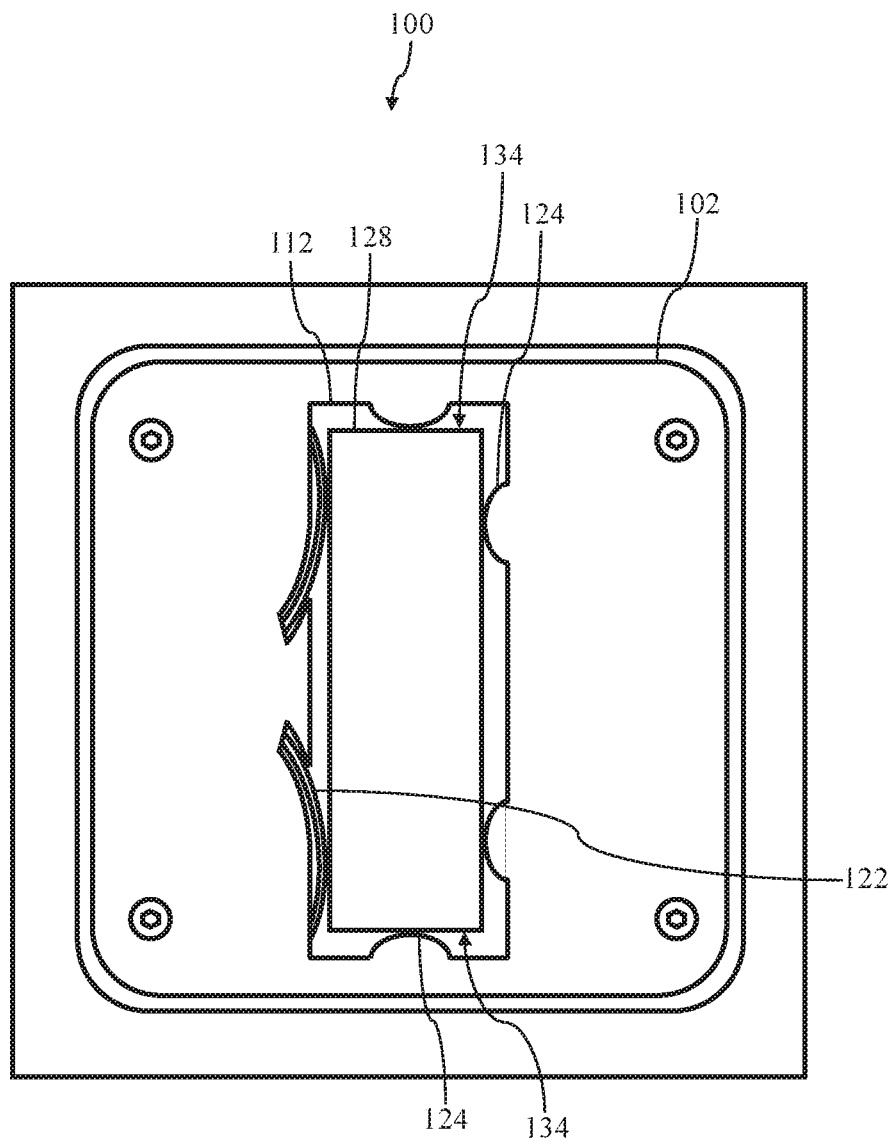
FIG. 5 depicts a top view of an additive manufacturing system including a retaining plate and a disposable build plate, according to alternative embodiments.

FIG. 5 shows retaining plate 102 of additive manufacturing system 100 including a plurality of pads 124 positioned substantially throughout seat 112. Specifically, retaining plate 102, as shown in FIG. 5, includes two pads 124 positioned opposite leaf springs 122, and two distinct pads 124 positioned adjacent leaf springs 122. As discussed herein with respect to FIG. 1B, pads 124 positioned opposite leaf springs 122 may contact build plate 128 on a side opposite leaf springs 122. Distinct pads 124 positioned adjacent leaf springs 122 may contact build plate 128 on opposite distal ends 134 of build plate 128. Pads 124 contacting build plate 128 at distal ends 134 may aid in retaining, securing and/or releasably coupling build plate 128 within seat 112 of retaining plate 102.

Figure 6:
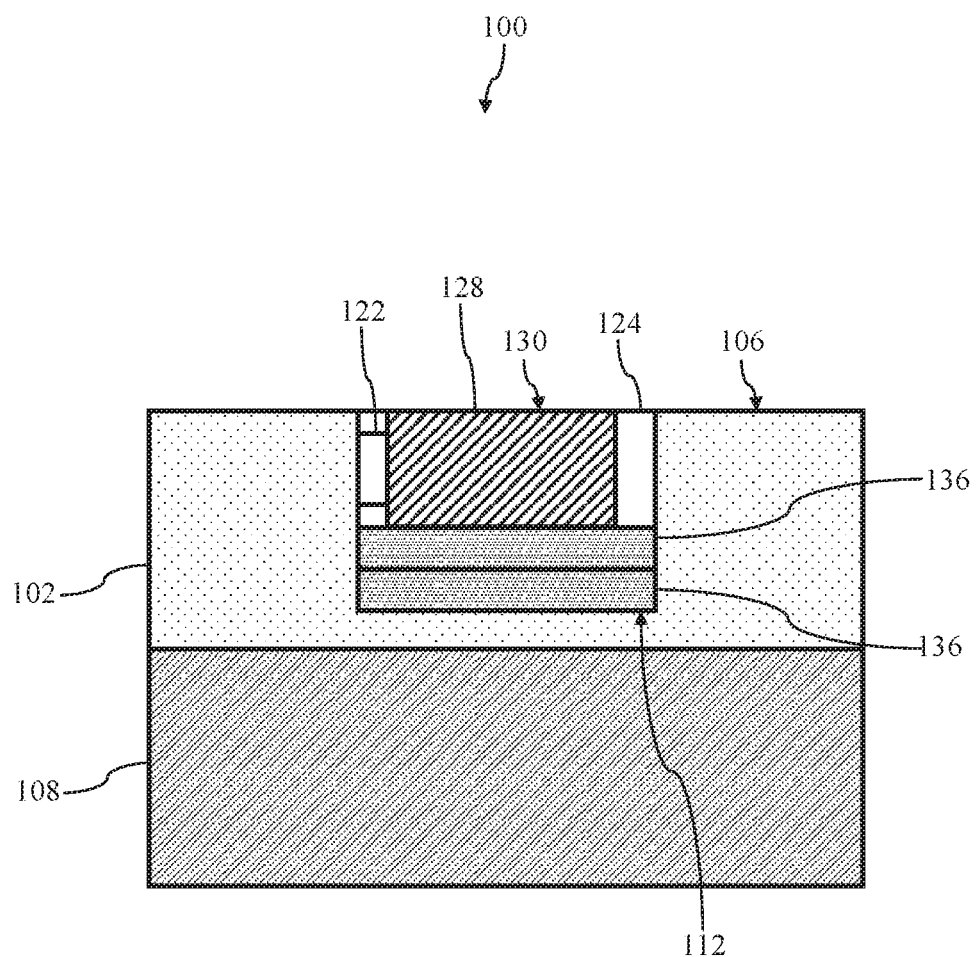
FIG. 6 depicts a side, cross-sectional view of the additive manufacturing system including a retaining plate, removable seat inserts and a disposable build plate, according to additional embodiments.

FIG. 6 depicts a cross-sectional side view of additive manufacturing system 100 according to other embodiments. In the non-limiting example shown in FIG. 6, retaining plate 102 of additive manufacturing system 100 may also include at least one removable seat insert 136. Removable seat inserts 136 may be positioned and secured within seat 112 of retaining plate 102 to adjust a depth ($D_{SEAT}$) of seat 112. Specifically, and as shown in FIG. 6, removable seat inserts 136 may be positioned and/or disposed within seat 112 to fill at least a portion of seat 112 and adjust a depth ($D_{SEAT}$) of seat 112 before build plate 128 is positioned within seat 112. Removable seat inserts 136 may be positioned within seat 112 below leaf springs 122 and pads 124. Adding or removing removable seat inserts 136 to alter the depth ($D_{SEAT}$) of seat 112 may ensure that distinct build plates 128 having different or unique thicknesses may be positioned within seat 112 and build surface 130 of build plate 128 is in planar alignment and/or even with exposed surface 106 of retaining plate 102. That is, by utilizing removable seat inserts 136, the depth ($D_{SEAT}$) of seat 112 may be easily adjusted, adapted and/or customized to receive a distinct number of build plates 128 having varying thicknesses without having to change the entire retaining plate 102 within additive manufacturing system 100.

Figure 7:
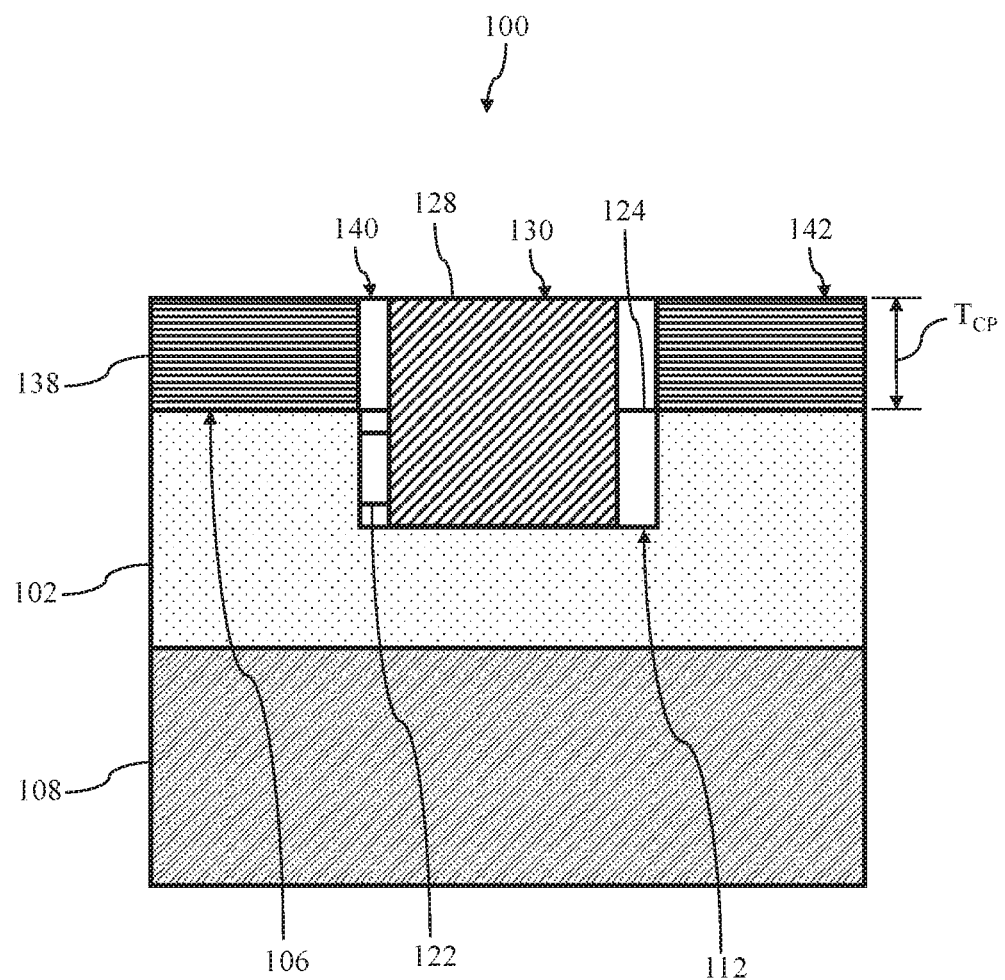
FIG. 7 depicts a side, cross-sectional view of the additive manufacturing system including a retaining plate, a cover plate and a disposable build plate, according to alternative embodiments.

FIG. 7 depicts a cross-sectional side view of additive manufacturing system 100 including a cover plate 138. Similar to removable seat inserts 136, cover plate 138 may be utilized by additive manufacturing system 100 to easily adjust, adapt and/or customize the depth ($D_{SEAT}$) of seat 112. Specifically, by utilizing cover plate 138, seat 112 of retaining plate 102 may receive a distinct number of build plates 128 having varying thicknesses without having to change the entire retaining plate 102 within additive manufacturing system 100. In the non-limiting example shown in FIG. 7, build plate 128 may include a thickness ($T_{BP}$) that is larger than the depth ($D_{SEAT}$) of seat 112. Without the inclusion of cover plate 138, build plate 128 may protrude out of seat 112 such that build surface 130 of build plate 128 is positioned above and/or out of planar alignment with exposed surface 106 of retaining plate 102. In the non-limiting example, cover plate 138 may be positioned over and/or disposed on exposed surface 106 of retaining plate 102 and may receive a portion of build plate 128 within an aperture 140 formed through cover plate 138. A thickness ($T_{CP}$) of cover plate 138 may correspond to the amount of build plate 128 that may protrude from seat 112 of retaining plate 102. As a result of positioning cover plate 138 over exposed surface 106 of retaining plate 102, build surface 130 of build plate 128 may be in planar alignment and/or lever with cover surface 142 of cover plate 138 during the component build process performed by additive manufacturing system 100. Cover plate 138 may be formed from any material capable of withstanding the component build process performed on build plate 128 including, but not limited to, metal, metal alloys, polymers, ceramics and any other material having substantially similar physical properties.

Figure 8:
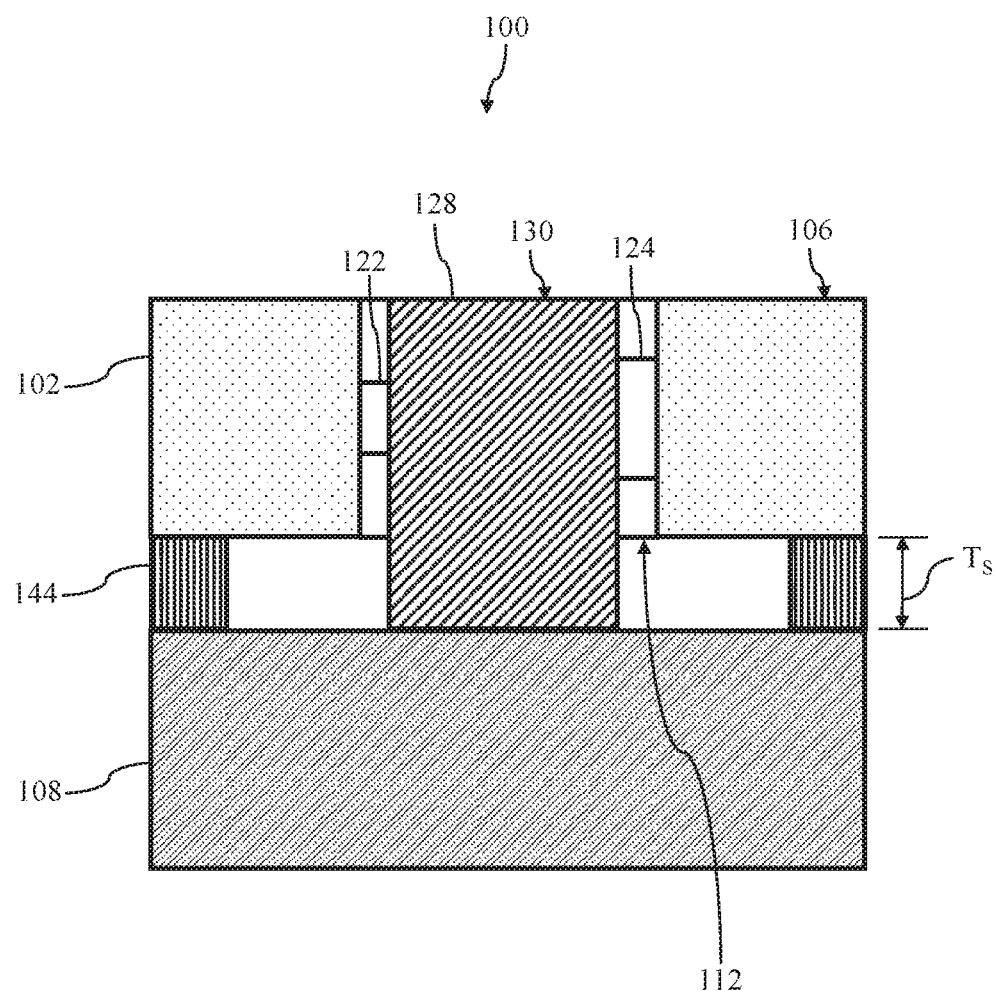
FIG. 8 depicts a side, cross-sectional view of the additive manufacturing system including a retaining plate, spacers and a disposable build plate, according to another embodiment.

FIG. 8 depicts a cross-sectional side view of additive manufacturing system 100 including spacers 144. Distinct from the other non-limiting examples discussed herein, seat 112 shown in FIG. 8 may be a through-hole or aperture formed completely through retaining plate 102. Although seat 112 may be a through-hole, build plate 128 may include a thickness ($T_{BP}$) that is larger than the depth ($D_{SEAT}$) of seat 112 of retaining plate 102. Similar to removable seat inserts 136 of FIG. 6 and cover plate 138 of FIG. 7, spacers 144 may be utilized by additive manufacturing system 100 to easily adjust, adapt and/or customize the depth ($D_{SEAT}$) of seat 112. Specifically, by utilizing spacers 144, seat 112 of retaining plate 102 may receive a distinct number of build plates 128 having varying thicknesses without having to change the entire retaining plate 102 within additive manufacturing system 100. In the non-limiting example, spacers 144 may be positioned between base 108 and retaining plate 102. Spacers 144 may also be coupled directly to, or alternatively, compressively fit between base 108 and retaining plate 102 as well. Like cover plate 138 of FIG. 7, a thickness ($T_S$) of spacers 144 may correspond to difference between the thickness ($T_{BP}$) of build plate 128 the depth ($D_{SEAT}$) of seat 112 of retaining plate 102. As a result of positioning spacers 144 between base 108 and retaining plate 102, build surface 130 of build plate 128 may be in planar alignment and/or lever with expose surface 106 of retaining plate 102 during the component build process performed by additive manufacturing system 100. In the non-limiting example, build plate 128 may be positioned on, directly contact and/or be supported by base 108 of additive manufacturing system 100. Spacers 144 may be individual components formed on at least two sides of build plate 128, or alternatively, may be formed as a plate having a through-hole aligned with seat 112 of retaining plate 102 and configured to receive at least a portion of build plate 128. Spacers 144 may be formed from any material capable maintaining a distance between base 108 and retaining plate 102 during the component build process including, but not limited to, metal, metal alloys, polymers, ceramics and any other material having substantially similar physical properties.

Figure 9:
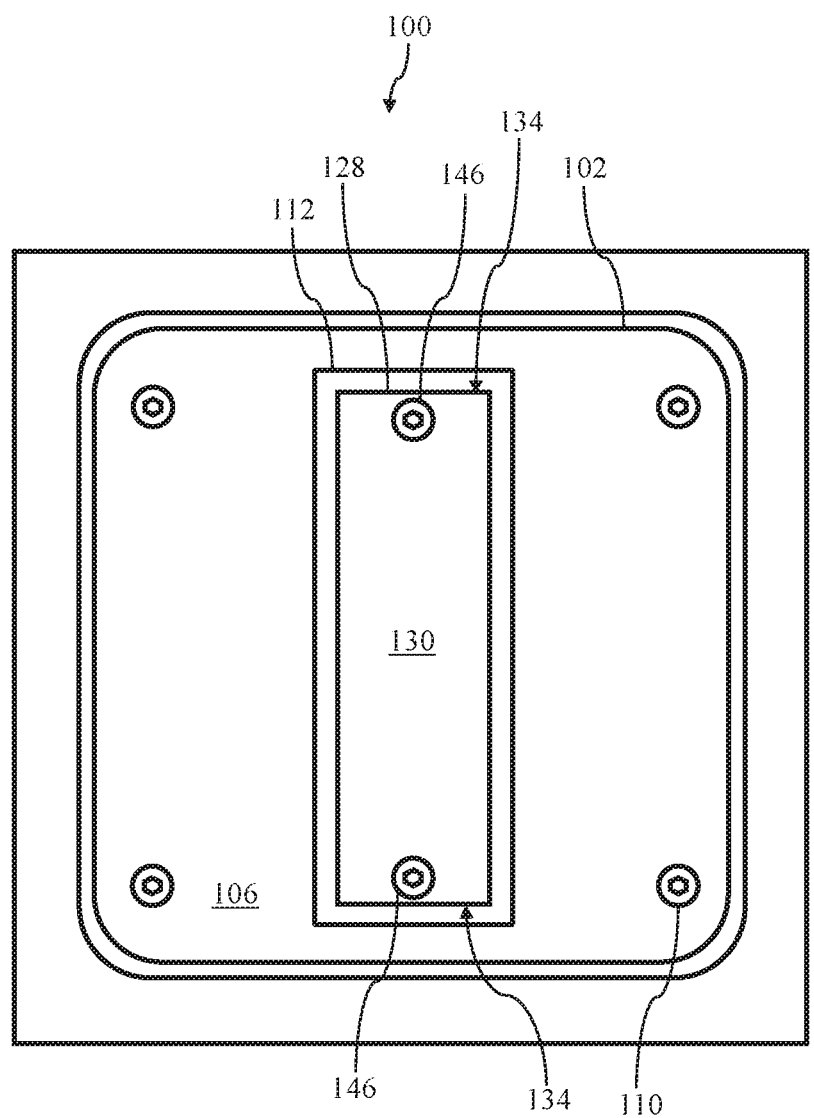
FIG. 9 depicts a top view of an additive manufacturing system including a retaining plate and a disposable build plate, according to additional embodiments.
Figure 10:
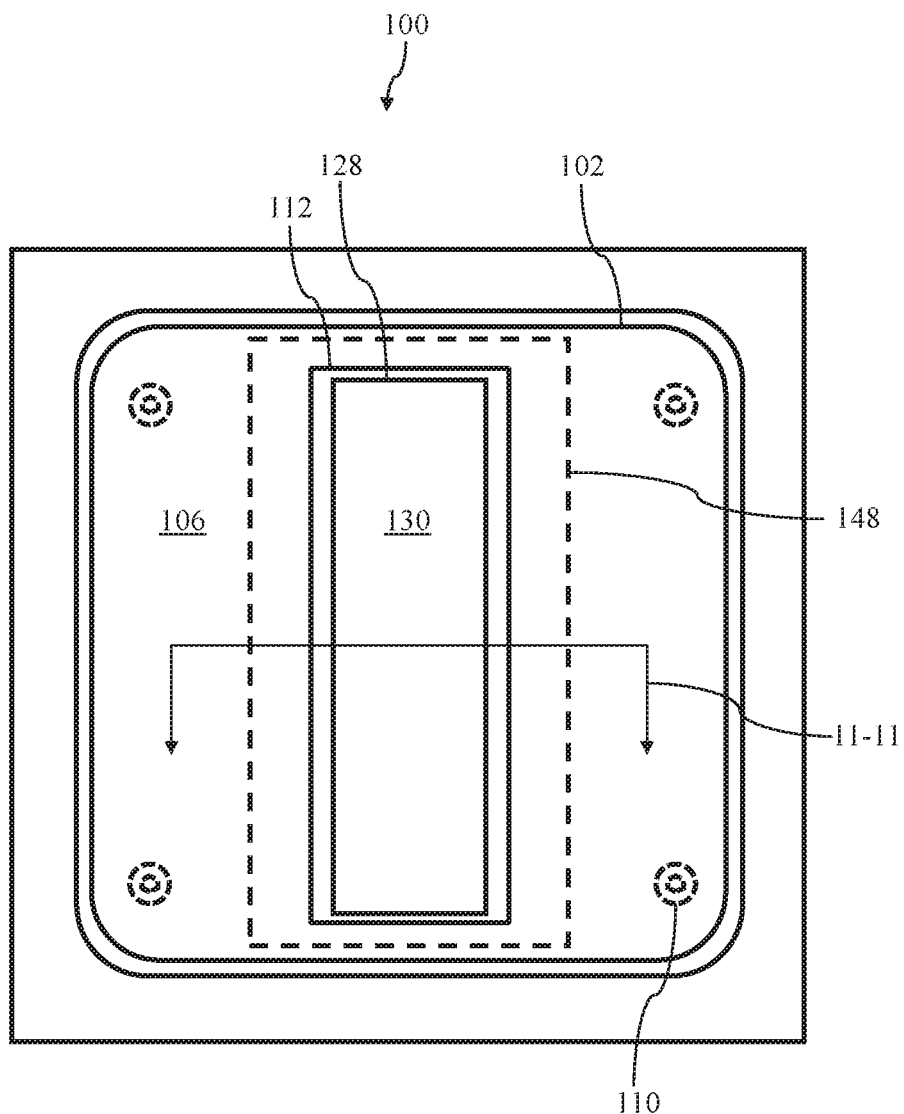
FIG. 10 depicts a top view of an additive manufacturing system including a retaining plate, a disposable build plate and a magnetic chuck, according to another embodiment.
Figure 11:
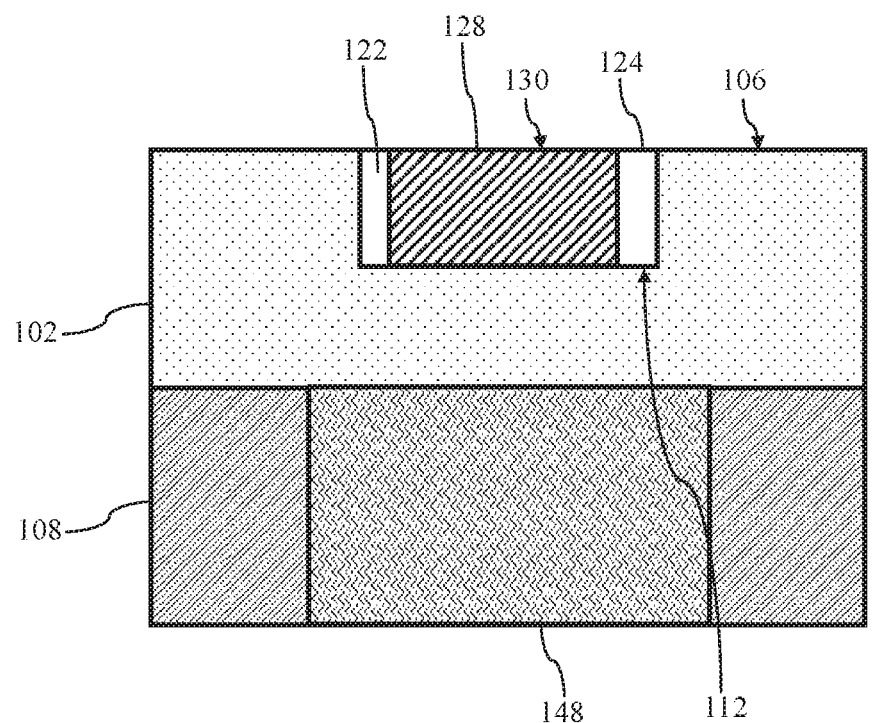
FIG. 11 depicts a side, cross-sectional view of the additive manufacturing system including the retaining plate, the disposable build plate, and the magnetic chuck taken along line 11-11 in FIG. 10, according to embodiments.

FIGS. 9-11 depict top views of additive manufacturing system 100 utilizing distinct build plate retention components for retaining build plate 128 within seat 112 of retaining plate 102. It is understood that similarly numbered and/or named components may function in a substantially similar fashion. Redundant explanation of these components has been omitted for clarity.

As shown in FIG. 9, additive manufacturing system 100 may include a plurality of build plate fasteners 146 (e.g., build plate retention components) for retaining, securing and/or releasably coupling build plate 128 within seat 112 of retaining plate 102. The plurality of build plate fasteners 146 may be positioned through build plate 128 and may be positioned at least partially through retaining plate 102 and/or base 108 (see, FIG. 2A) for coupling build plate within seat 112. That is, the plurality of build plate fasteners 146 may be positioned through build plate 128 and partially positioned through and coupled to retaining plate 102, below seat 112. Alternatively, the plurality of build plate fasteners 146 may be positioned through build plate 128 and retaining plate 102, and partially positioned through and coupled to base 108 in a similar fashion as discussed above with respect to mechanical fasteners 110. The plurality of build plate fasteners 146 may also be positioned adjacent distal ends 134 of build plate 128 to obstruct as little of build surface 130 of build plate as possible.

Leaf springs 122 and pads 124 are not depicted in FIG. 9. In the non-limiting example shown in FIG. 9, the plurality of build plate fasteners 146 may be the only component used to retain build plate 128 within seat 112. In another non-limiting example, not shown, additive manufacturing system 100 may include leaf springs 122, pads 124 and the plurality of build plate fasteners 146, such that the plurality of build plate fasteners 146 aid the leaf springs 122 and pads 124 in retaining build plate 128 within seat 112. Although two build plate fasteners 146 are shown in FIG. 9, it is understood that this number of build plate fasteners is merely exemplary, and additive manufacturing system 100 may include more or less build plate fasteners for retaining, securing and/or releasably coupling build plate 128 within seat 112 of retaining plate 102. The plurality of build plate fasteners 146 may be any suitable coupling component including, but not limited to, screws, nuts-and-bolts, split pin, rivet and any other mechanical fastener capable of releasably coupling build plate 128 within seat 112.

FIGS. 10 and 11 depict the use of a magnetic chuck 148 as a build plate retention component. Specifically, additive manufacturing system 100, as shown in FIGS. 10 and 11, may include a magnetic chuck 148 (shown in phantom in FIG. 10) that may be utilized to retain, secure and/or releasably couple build plate 128 within seat 112 of retaining plate 102. Magnetic chuck 148 may be positioned below build plate 128. In a non-limiting example shown in the side cross-sectional view of FIG. 11, magnetic chuck 148 may be integrally formed within base 108 of additive manufacturing system 100, and may be positioned directly below and/or in contact with retaining plate 102. Where build plate 128 includes magnetic properties, magnetic chuck 148 may emit a magnetic field and/or may magnetically attract build plate 128, in order to retain, secure and/or releasably couple build plate 128 within seat 112. As shown in FIG. 10, mechanical fasteners 110 are shown in phantom as optional. In a non-limiting example, in addition to magnetically attracting build plate 128 to releasably couple build plate 128 within seat 112, magnetic chuck 148 may also magnetically attract retaining plate 102 to releasably couple retaining plate 102 to base 108.

Similar to non-limiting example depicted in FIG. 9, leaf springs 122 and pads 124 are not depicted in FIGS. 10 and 11. In the non-limiting example shown in FIGS. 10 and 11, magnetic chuck 148 may be the only component used to retain build plate 128 within seat 112. In another non-limiting example, not shown, additive manufacturing system 100 may include leaf springs 122, pads 124 and magnetic chuck 148. In this non-limiting example, magnetic chuck 148 may aid leaf springs 122 and pads 124 in retaining build plate 128 within seat 112.

Figure 12A:
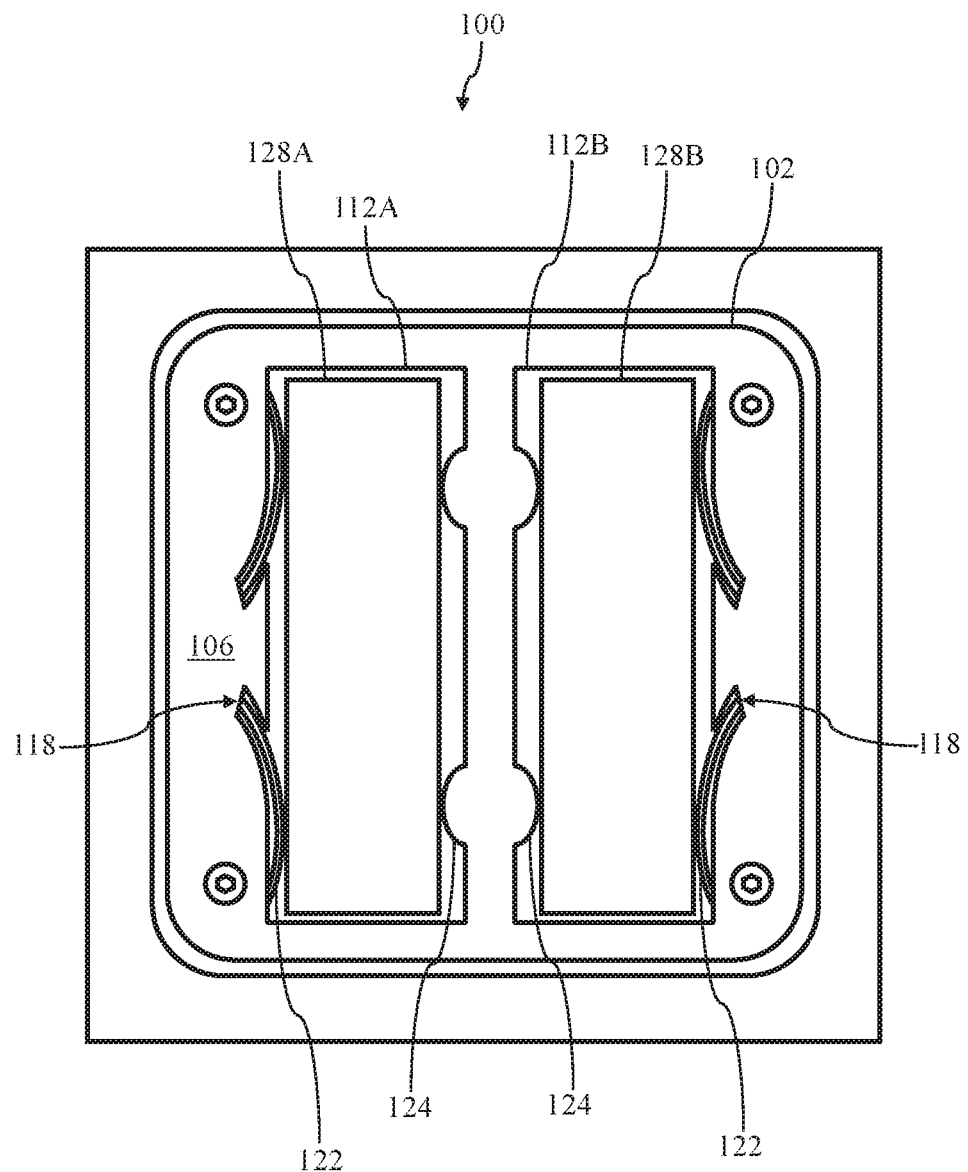
FIG. 12A depicts a top view of an additive manufacturing system including a retaining plate having two seats, and two disposable build plates, according to embodiments.
Figure 12B:
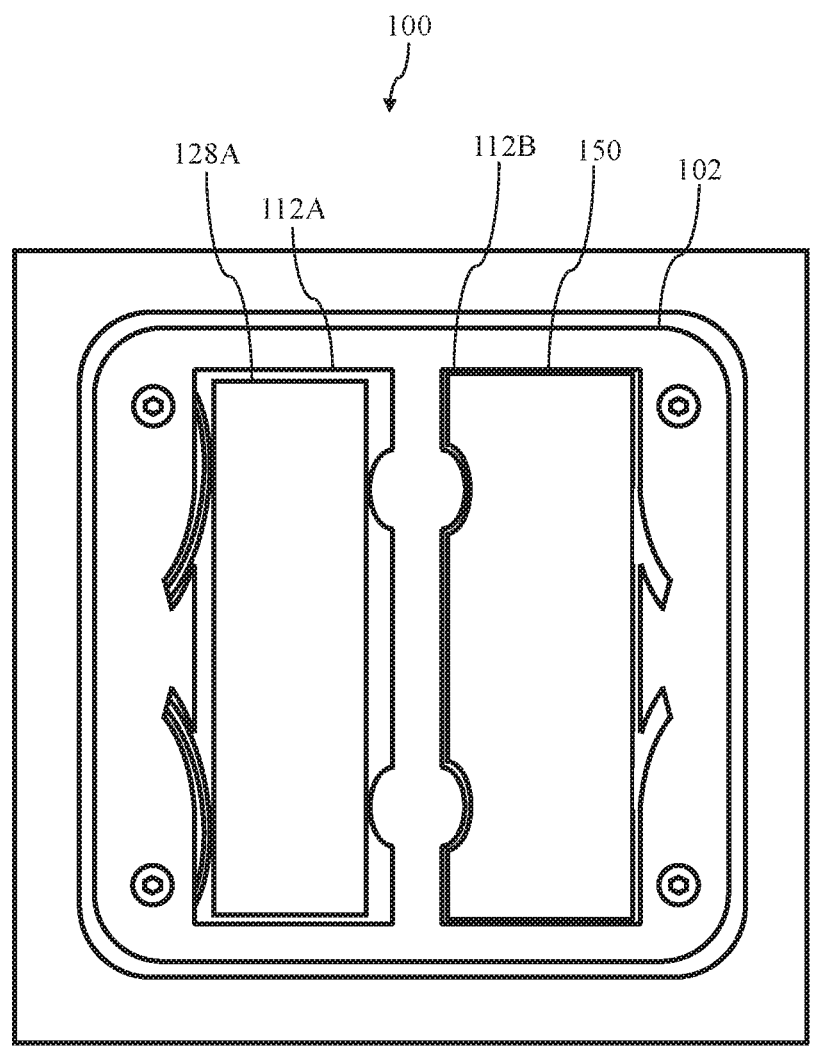
FIG. 12B depicts a top view of the additive manufacturing system of FIG. 12A including the retaining plate having two seats, a single disposable build plate and a filler plate, according to embodiments.

Although a single seat 112 is discussed herein as being formed in retaining plate 102, it is understood that more than one seat 112 may be formed in and/or utilized by retaining plate 102 of additive manufacturing system 100. In non-limiting examples shown in FIGS. 12A and 12B, retaining plate 102 may include two (or more) seats 112A, 112B formed in exposed surface 106. A first seat 112A may be formed in exposed surface 106 of retaining plate 102, and a second seat 112B may be formed in exposed surface 106 of retaining plate 102 adjacent first seat 112A. Each seat 112A, 112B may include leaf springs 122 positioned within leaf spring apertures 118 and pads 124. As similarly discussed herein, leaf springs 122 and pads 124 of seats 112A, 112B may be utilized to retain, secure and/or releasably couple build plates 128A, 128B in the respective seat 112A, 112B, as shown in FIG. 12A. In some instances however, the component building process performed by additive manufacturing system 100 may only require a single build plate 128A for building a component. In the non-limiting example shown in FIG. 12B, although retaining plate 102 includes two seats 112A, 112B, a first build plate 128A may only be positioned within first seat 112A. Second seat 112B may receive, retain, secure and/or releasably couple a filler plate 150 where only a single build plate 128A is required to performing the component building process. As shown in FIG. 12B, filler plate 150 may be positioned within second seat 112B and may substantially fill and/or occupy the recess forming second seat 112B of retaining plate 102. By forming two (or more) seats 112A, 112B in retaining plate 102, additive manufacturing system 100 may produce and/or build more components during a single component build process, which may in turn increase production time.

Figure 13:
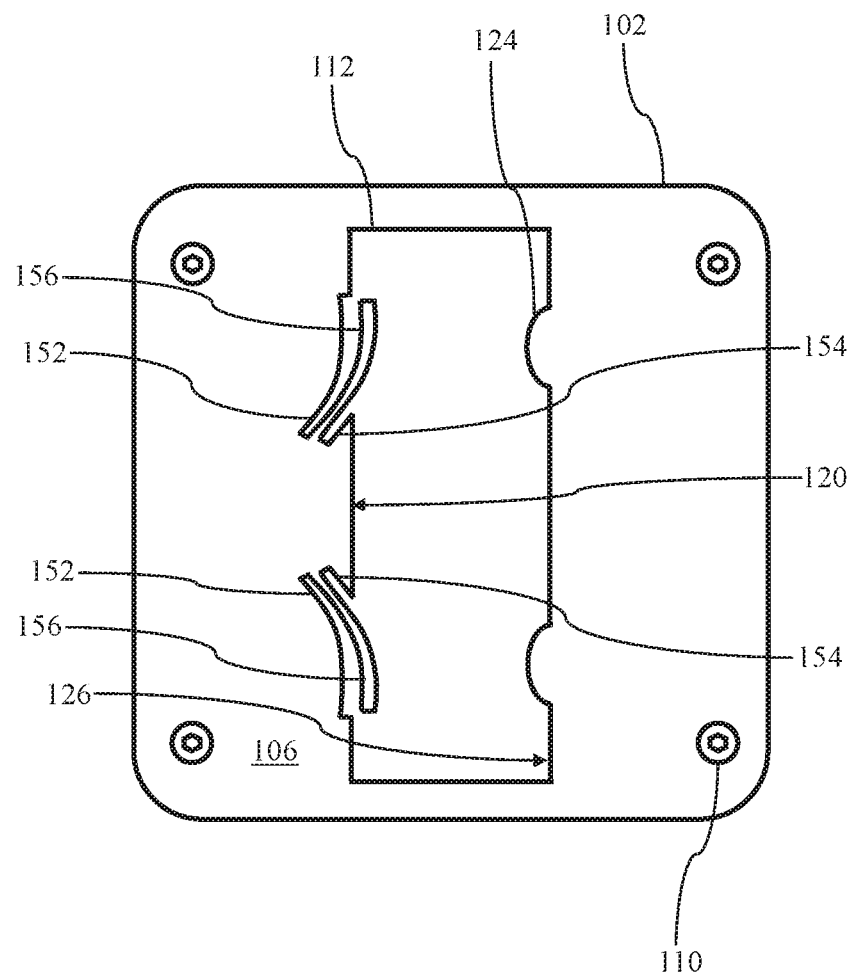
FIG. 13 depicts a top view of a retaining plate for an additive manufacturing system, according to additional embodiments.

FIG. 13 depicts a top view of retaining plate 102 include two distinct leaf spring apertures. Specifically, retaining plate 102 depicted in FIG. 13 includes outer leaf spring apertures 152 and inner leaf spring apertures 154 formed in and/or partially through exposed surface 106 of retaining plate 102. Outer leaf spring apertures 152 may be formed in and/or through first sidewall 120 of retaining plate 102 and may be formed in retaining plate 102 opposite pads 124 formed on second sidewall 126. Inner leaf spring apertures 154 may be formed adjacent outer leaf spring apertures 152 and/or first sidewall 120 and may be positioned opposite pads 124. As shown in FIG. 13, outer leaf spring apertures 152 and inner leaf spring apertures 154 may also be separated by a leaf spring protrusion 156 formed in retaining plate 102. Outer leaf spring apertures 152 and inner leaf spring apertures 154 may each contain and/or receive distinct leaf springs 122 (see, FIG. 1A) that may contact and/or retain build plate 128 (see, FIG. 1B) within seat 112 as similarly discussed herein. Additionally, leaf spring protrusions 156 may aid in retaining the distinct leaf springs 122 within outer leaf spring apertures 152 and inner leaf spring apertures 154, respectively, and/or may provide support to the distinct leaf springs 122.

Figure 14:
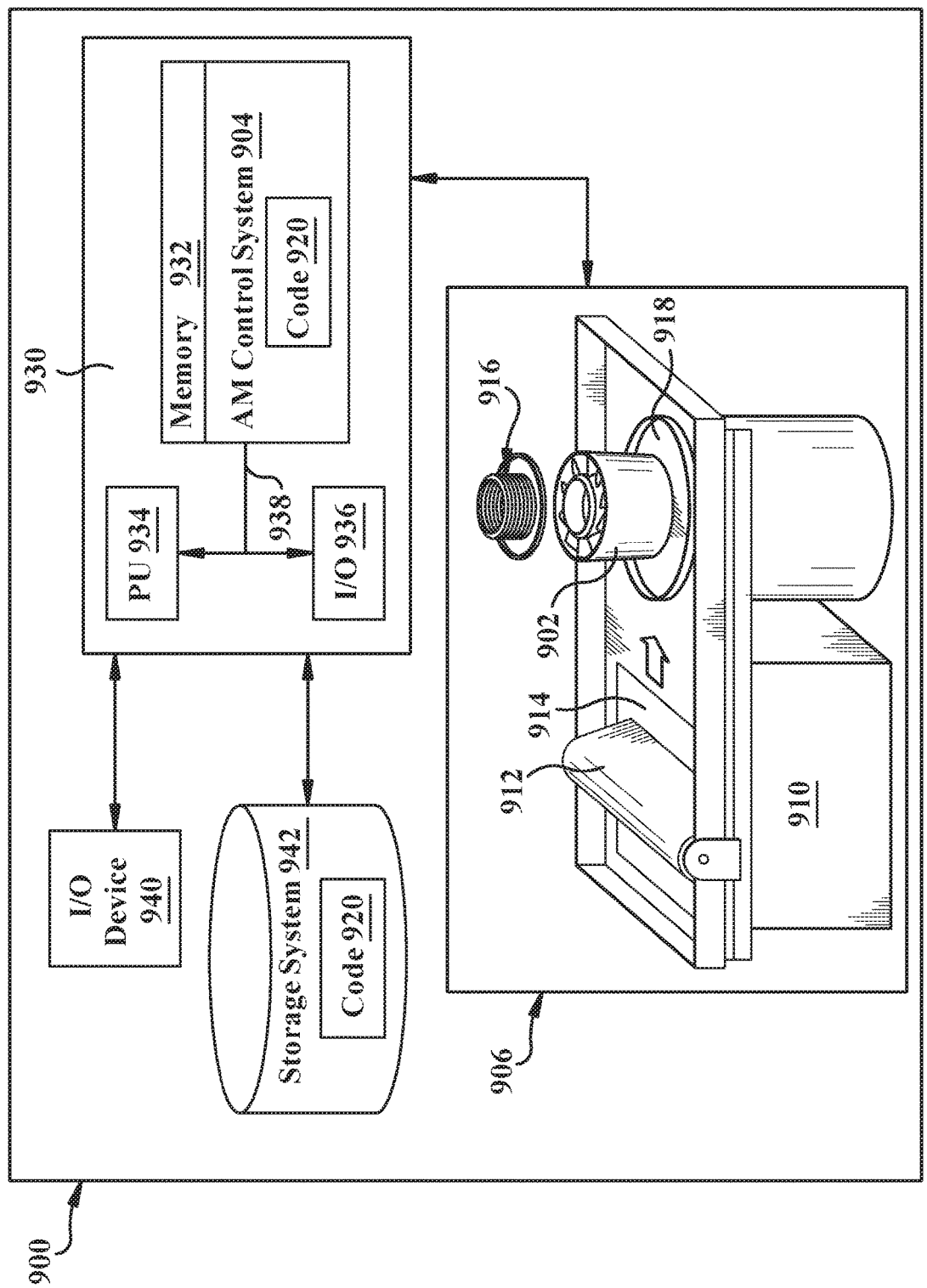
FIG. 14 shows a block diagram of an additive manufacturing system and process including a non-transitory computer readable storage medium storing code representative of an components generated by additive manufacturing system, according to embodiments.

To illustrate an example additive manufacturing process, FIG. 14 shows a schematic/block view of an illustrative computerized additive manufacturing system 900 for generating an object 902. In this example, system 900 is arranged for DMLM. It is understood that the general teachings of the disclosure are equally applicable to other forms of additive manufacturing. Object 902 is illustrated as a double walled turbine element; however, it is understood that the additive manufacturing process can be readily adapted to manufacture any component on build plates 128, as discussed herein. Additive manufacturing system 900 generally includes a computerized additive manufacturing control (AM) system 904 and an additive manufacturing (AM) printer 906. Additive manufacturing system 900, as will be described, executes code 920 that includes a set of computer-executable instructions defining a component(s) to physically generate the object using additive manufacturing printer 906. Each additive manufacturing process may use different raw materials in the form of, for example, fine-grain powder, liquid (e.g., polymers), sheet, etc., a stock of which may be held in a chamber 910 of additive manufacturing printer 906. In the instant case, the component(s) may be made of stainless steel or similar materials. As illustrated, an applicator 912 may create a thin layer of raw material 914 spread out as the blank canvas from which each successive slice of the final object will be created. In other cases, applicator 912 may directly apply or print the next layer onto a previous layer as defined by code 920, e.g., where the material is a polymer. In the example shown, a laser or electron beam 916 fuses particles for each slice, as defined by code 920. Various parts of additive manufacturing printer 906 may move to accommodate the addition of each new layer, e.g., a build platform 918 may lower and/or chamber 910 and/or applicator 912 may rise after each layer.

Additive manufacturing control system 904 is shown implemented on computer 930 as computer program code. To this extent, computer 930 is shown including a memory 932, a processor 934, an input/output (I/O) interface 936, and a bus 938. Further, computer 930 is shown in communication with an external I/O device/resource 940 and a storage system 942. In general, processor 934 executes computer program code, such as additive manufacturing control system 904, that is stored in memory 932 and/or storage system 942 under instructions from code 920 representative of component(s) to be built on build plate 128, as described herein. While executing computer program code, processor 934 can read and/or write data to/from memory 932, storage system 942, I/O device 940 and/or additive manufacturing printer 906. Bus 938 provides a communication link between each of the components in computer 930, and I/O device 940 can comprise any device that enables a user to interact with computer 940 (e.g., keyboard, pointing device, display, etc.). Computer 930 is only representative of various possible combinations of hardware and software. For example, processor 934 may comprise a single processing unit, or be distributed across one or more processing units in one or more locations, e.g., on a client and server. Similarly, memory 932 and/or storage system 942 may reside at one or more physical locations. Memory 932 and/or storage system 942 can comprise any combination of various types of non-transitory computer readable storage medium including magnetic media, optical media, random access memory (RAM), read only memory (ROM), etc. Computer 930 can comprise any type of computing device such as a network server, a desktop computer, a laptop, a handheld device, a mobile phone, a pager, a personal data assistant, etc.

Additive manufacturing processes begin with a non-transitory computer readable storage medium (e.g., memory 932, storage system 942, etc.) storing code 920 representative of one or more component(s), discussed herein as being built on build plate(s) of additive manufacturing system 100. As noted, code 920 includes a set of computer-executable instructions defining component(s) that can be used to physically generate the tip, upon execution of the code by system 900. For example, code 920 may include a precisely defined 3D model of component(s) and can be generated from any of a large variety of well-known computer aided design (CAD) software systems such as AutoCAD®, TurboCAD®, DesignCAD 3D Max, etc. In this regard, code 920 can take any now known or later developed file format. For example, code 920 may be in the Standard Tessellation Language (STL) which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. Code 920 may be translated between different formats, converted into a set of data signals and transmitted, received as a set of data signals and converted to code, stored, etc., as necessary. Code 920 may be an input to system 900 and may come from a part designer, an intellectual property (IP) provider, a design company, the operator or owner of system 900, or from other sources. In any event, AM control system 904 executes code 920, dividing component(s) build on build plate 128 into a series of thin slices that it assembles using AM printer 906 in successive layers of liquid, powder, sheet or other material. In the DMLM example, each layer is melted to the exact geometry defined by code 920 and fused to the preceding layer. Subsequently, the component(s) may be exposed to any variety of finishing processes, e.g., minor machining, sealing, polishing, assembly to parts or components, etc.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

We claim:

1. An additive manufacturing system comprising:
   a base;
   a retaining plate coupled to the base, the retaining plate including:
      a seat formed in an exposed surface of the retaining plate, and
      a plurality of pads extending laterally into the seat;
   a build plate positioned within the seat and contacting the plurality of pads of the retaining plate, the build plate including a build surface in substantial planar alignment with the exposed surface of the retaining plate; and
   a plurality of leaf springs positioned in the seat of the retaining plate, each of the plurality of leaf springs utilized to retain the build plate within the seat of the retaining plate.

2. The additive manufacturing system of claim 1, wherein the seat includes:
   a predetermined depth; and
   a predetermined width.

3. The additive manufacturing system of claim 2, wherein the build plate includes:
   a thickness equal to the predetermined depth of the seat formed in the retaining plate; and
   a width less than the predetermined width of the seat formed in the retaining plate.

4. The additive manufacturing system of claim 1, wherein at least a portion of the plurality of pads contact the build plate opposite the plurality of leaf springs.

5. The additive manufacturing system of claim 1, further comprising a plurality of leaf spring apertures formed in a sidewall of the seat and partially through the retaining plate, each of the leaf spring apertures for receiving at least one of the plurality of leaf springs.

6. The additive manufacturing system of claim 1, further comprising at least one sizing component positioned within the seat, the at least one sizing component contacting the build plate and positioned between the build plate and at least one of:
   the plurality of leaf springs; or
   the plurality of pads of the retaining plate.

7. The additive manufacturing system of claim 1, further comprising a distinct build plate positioned within the seat of the retaining plate, the distinct build plate contacting the build plate.

8. An additive manufacturing system comprising:
   a base;
   a retaining plate coupled to the base, the retaining plate including:
      a first seat formed in an exposed surface of the retaining plate,
      a second seat formed in the exposed surface of the retaining plate, adjacent the first seat, and
      at least one pad extending laterally into at least one of the first seat or the second seat;
   at least one build plate positioned within at least one of the first seat or the second seat and contacting the at least one pad of the retaining plate, the at least one build plate including a build surface in substantial planar alignment with the exposed surface of the retaining plate; and
   a build plate retention component positioned at least partially within at least one of the first seat or the second seat of the retaining plate, the build plate retention component releasably coupling the at least one build plate to the retaining plate.

9. The additive manufacturing system of claim 8, wherein the at least one build plate includes a first build plate positioned within the first seat.

10. The additive manufacturing system of claim 9, wherein the at least one build plate includes a second build plate positioned within the second seat.

11. The additive manufacturing system of claim 9, further comprising a filler plate positioned within the second seat.

12. The additive manufacturing system of claim 8, wherein the build plate retention component is selected from a group consisting of: a plurality of leaf springs, a plurality of fasteners and a magnetic chuck.

13. The additive manufacturing system of claim 8 further comprising a cover plate positioned over the exposed surface of the retaining plate, the cover plate for adjusting a depth of at least one of the first seat or the second seat of the retaining plate receiving the at least one build plate.

14. The system of claim 8, wherein at least one of the first seat or the second seat comprises a through-hole formed through the retaining plate.

15. The additive manufacturing system of claim 14 further comprising spacers positioned between and coupled to the base and the retaining plate, the spacers for adjusting a depth of the through-hole receiving the at least one build plate.

16. A retaining plate for an additive manufacturing system, the retaining plate comprising:
   an exposed surface;
   a first seat formed in the exposed surface, the first seat including a predetermined depth;
   at least one pad extending laterally into the first seat from a sidewall of the first seat; and
   a first group of leaf spring apertures formed in the sidewall of the first seat, each of the first group of leaf spring apertures for receiving at least one leaf spring utilized to retain a first build plate within the first seat.

17. The retaining plate of claim 16, further comprising:
   at least one distinct seat formed in the exposed surface, the at least one distinct seat formed adjacent the first seat;
   at least one distinct pad extending into the at least one distinct seat from a sidewall of the at least one distinct seat; and
   at least one distinct group of leaf spring apertures formed in the sidewall of the at least one distinct seat.

18. The retaining plate of claim 17, further comprising at least one removable seat insert positioned within the first seat, the at least one removable seat insert configured to adjust a depth of the first seat.

* * * * *